United States Patent [19]

Lohr et al.

[11] 4,347,333

[45] Aug. 31, 1982

[54] EMULSION COATING COMPOSITION CONTAINING SILICONE AND ACRYLIC POLYMER

[75] Inventors: Robert H. Lohr, Union Grove; Lee W. Morgan, Racine, both of Wis.

[73] Assignee: S. C. Johnson & Son, Inc., Racine, Wis.

[21] Appl. No.: 159,723

[22] Filed: Jun. 16, 1980

[51] Int. Cl.³ ............................................... C08J 3/00
[52] U.S. Cl. ......................................... 524/269; 106/3; 106/10; 524/267; 524/457; 524/458; 524/490
[58] Field of Search ................ 106/3, 10; 260/28.5 A, 260/28.5 AV, 29.2 M; 524/269, 267, 457, 458, 490

[56] References Cited

U.S. PATENT DOCUMENTS

| | | | |
|---|---|---|---|
| 3,011,988 | 12/1961 | Luedke et al. | 260/32.8 R |
| 3,393,078 | 7/1968 | Lockhart et al. | 106/10 |
| 3,429,842 | 2/1969 | Wolstoncroft | 260/28.5 AV |
| 3,847,622 | 11/1974 | Brandl et al. | 106/10 |
| 3,960,575 | 6/1976 | Martin | 260/29.2 M |

*Primary Examiner*—Melvyn I. Marquis

[57] ABSTRACT

Oil-in-water and water-in-oil emulsion hard surface coating compositions containing a solvent within a specified solubility parameter, silicone fluids, an acrylic polymer soluble in the solvent, surfactants, water and optionally waxes and abrasives. The compositions have excellent detergent resistance, have good gloss and buff properties.

11 Claims, No Drawings

EMULSION COATING COMPOSITION CONTAINING SILICONE AND ACRYLIC POLYMER

BACKGROUND OF THE INVENTION

This invention relates to a hard surface coating composition having improved durability. More particularly this invention relates to an improved auto polish composition having extended life.

The compositions of the present invention have a substantial quantity of silicone which is desirable in auto care products to enhance the water beading, the depth of gloss and application properties. The amount of silicone used in the composition of the present invention is far in excess of the small amounts which might be present in a composition which uses the silicone as a leveling agent.

Acrylic polymers have long been used in various coating compositions to provide high gloss, detergent resistance and coating durability. However, as silicone polymers are generally incompatible with acrylic polymers, a choice had to be made between utilizing an acrylic polymer in the composition or utilizing a silicone polymer. Up to the present time, no one has been able to combine an effective amount of both a silicone polymer and an acrylic polymer in a commercially saleable, shelf stable product.

U.S. Pat. No. 2,862,900 describes a resin-fortified wax polish composition. This composition includes a non-acrylic resin formed from cyclohexyl allyl maleate in combination with a number of ingredients. One composition described includes waxes, surfactants, resin and silicone in an aqueous system. However, this system does not include a substantial solvent content. This patent describes compositions which either are solvent based or aqueous based and does not describe compositions having a substantial quantity of both water and solvent in combination with an acrylic polymer, waxes and silicones.

U.S. Pat. No. 2,839,482 describes a wax-silicone-resin polish. The resins utilized in this composition are relatively low molecular weight materials not similar to the acrylic polymers described in the instant specification.

U.S. Pat. No. 3,429,842 describes a polish composition including a wax, an acrylic copolymer, an aqueous system and a small percentage of silicone used as a leveling agent far below the quantities of silicone present in the present compositions.

U.S. Pat. No. 3,544,498 describes a conventional hard surface polish composition which includes an amine-functional silicone to provide enhanced detergent resistance. This patent does not describe the utilization of any acrylic polymers.

U.S. Pat. No. 3,553,123 describes a polish composition for hard surfaces including furniture and floors including wax and various resins. However, neither of the compositions described in the examples include a silicone nor does any portion of the specification disclose or suggest the inclusion of a silicone in these compositions.

U.S. Pat. No. 3,011,988 describes acrylic tetrapolymers used in various protective compositions. These compositions are aqueous dispersions of the polymer which are coated on a variety of substrates.

British Pat. No. 681,877 describes wax-silicone compositions which do not include resins.

U.S. Pat. Nos. 2,550,438, 2,547,396, 3,563,941, 4,013,475 and 4,055,433 describe various polish compositions which include waxes, solvents and surfactants but do not include any polymeric materials.

BRIEF DESCRIPTION OF THE INVENTION

It is therefore surprisingly found that useful stable emulsion hard surface coating compositions can be prepared comprising a substantial percentage of solvent, a substantial percentage of silicone, a substantial percentage of water and from about 0.5 to 3 percent by weight of an acrylic polymer. This composition provides both good performance properties and good emulsion stability and, at the same time, provides the benefits of both the silicone and the acrylic polymer without detracting substantially from the effects of either.

OBJECTS AND ADVANTAGES

It is therefore the primary object of the present invention to provide an emulsion hard surface coating composition containing both an acrylic polymer and a substantial percentage of silicone.

It is a further object of the present invention to provide an auto polish composition having extended durability, high gloss and easy application.

It is a still further object of the present invention to provide a coating composition including water, solvent, silicone and an acrylic polymer.

It is a still further object of the present invention to provide a stable oil-in-water emulsion including a silicone polymer and an acrylic polymer.

It is a still further object of the present invention to provide an emulsion coating composition which can be used on a variety of hard surfaces.

It is a still further object of the present invention to provide a stable water-in-oil emulsion including both a silicone polymer and an acrylic polymer.

Still further objects and advantages of the composition of the present invention will become more apparent from the following more detailed description thereof.

DETAILED DESCRIPTION OF THE INVENTION

The present invention relates to a hard surface emulsion coating composition comprising:
(a) At least one solvent with the proviso that (i) if the solvent is a poor hydrogen bonding solvent the solubility parameter of the solvent is from about 6.0 to 8.2 or (ii) if the solvent is a moderate hydrogen bonding solvent, the solubility parameter of the solvent is from about 6.0 to 7.5;
(b) Water;
(c) From about 0.5 to 8% by weight of at least one surfactant;
(d) From 0 to about 20% by weight of an abrasive;
(e) From about 3 to 15% by weight of a silicone;
(f) From 0 to about 10% by weight of a wax; and
(g) From about 0.5 to 3% by weight of an acrylic polymer which has an Mn of greater than about 3000 and soluble in said solvent,
with the proviso that: (i) if the emulsion is an oil-in-water emulsion, then the solvent is present in an amount of from about 5–65% by weight and the water is present in an amount of from about 15 to 90% by weight; or (ii) if the emulsion is a water-in-oil emulsion, then the solvent is present in an amount of from about 15–90% by weight and the water is present in an amount of from about 5 to 65% by weight.

The composition of the present invention may be either oil-in-water emulsions or water-in-oil emulsions. It is preferred to use an oil-in-water emulsion because this type of emulsion generally has a lower degree of toxicity, flammability and tends to perform somewhat better than similar water-in-oil emulsion systems.

Oil-in-water emulsions have been preferred as auto polishes for exactly the above reasons, however it has been difficult if not impossible to incorporate high molecular weight acrylic materials into emulsion systems especially oil-in-water emulsions containing a silicone polymer without causing performance problems or causing the emulsion to break causing toxicology and flammability problems.

The compositions of the present invention must include a solvent. If the emulsion is an oil-in-water emulsion, the solvent should be present in an amount of from about 5 to about 65% by weight based on the total weight of the composition. If the emulsion is a water-in-oil emulsion, the solvent should be present in an amount of from about 15–90% by weight.

The solvent should have good cleaning characteristics however should not have such high solvency power that it will damage the surface to be coated. For an auto finish composition these solvents may be selected from a wide variety of materials well known to those skilled in the art. In general, the solvent should have a distillation range of from about 190° to 510° F. Representative solvents include hydrocarbons and particularly isoparaffinic hydrocarbons, naphtha, Stoddard solvent, kerosene, turpentine, aliphatic hydrocarbons, cycloaliphitic hydrocarbons and mixtures thereof.

The distillation range described above is important in that should the solvent have too high a volatility it will evaporate prematurely from the composition during application. This would cause excessive rubbing in order to obtain a uniform film thickness and removal of tars. If the volatility of solvent is too low, the composition will require excessive time to dry before it can be buffed.

All solvents have differing solvency. The relative solvency of solvents is often characterized using solubility parameters. There is a description of solubility parameters and tables showing solubility parameters and relative hydrogen bonding capabilities of various solvents in the Polymer Handbook, 2nd Ed., John Wiley and Sons, 1975, pages IV-337 to IV-348. The values for the solubility parameter, used in the instant specification and claims are in $[cal/cm^3]^{\frac{1}{2}}$.

As solubility parameter and hydrogen bonding capacity are interrelated to produce the solvency of the solvent, the solubility parameter for poor hydrogen bonding solvents should be within the range of from about 6.0 to 8.2 and preferably 6.5 to 8.2 and the solubility parameter for moderate hydrogen bonding solvents should be within the range of from about 6.0 to 7.5 and preferably 6.5 to 7.5. It is within this range that solvents exhibit sufficient solvency to properly dissolve the polymer used in the composition of the present invention while at the same time do not have such good solvency that they attack the surface being coated.

Examples of suitable poor hydrogen bonding solvents include n-decane, isobutylene, low odor mineral spirits, n-pentane, 1,3-butadiene, Shell So. 72, Apco #140 solvent, n-hexane, m-heptane, 1-hexane, Shell TS28 solvent, Apco #18 solvent, n-octane, VM&P naphtha, Varsol #2, Socal solvent No. 3, Apco thinner, methylcyclohexane, dodecane, Socal Solvent No. 2, Socal Solvent No. 1, turpentine, cyclohexane, cymene, 2-2 dichloropropane, kerosene, Stoddard solvent and the like.

Examples of suitable moderate hydrogen bonding solvents include diisopropyl ether, isopropyl ether, diisodecyl phthalate, di-n-amyl ether, ethyl caprylate, diethyl ether, butyl stearate, ethyl isobutyl ether and the like.

For oil-in-water emulsions of the present invention, the solvent should be present in the composition in an amount of from about 5 to 65% by weight. It is preferred that solvent be present in an amount of from about 20 to 60% by weight and it is most preferred that the solvent be present in an amount of from about 25 to 40% by weight.

For water-in-oil emulsions the solvent should be present in an amount of from about 15 to 90% by weight and preferably from about 20 to 55%.

The composition of the present invention also includes water. The water need not be specially treated but can be either distilled, deionized or ordinary tap water. For oil-in-water emulsions the water should be present in an amount of from about 15 to 90% by weight and preferably from about 25 to 45% by weight. For water-in-oil emulsions, the composition should include from about 5 to 65% by weight, and preferably from about 20 to 60% by weight, water.

The emulsion hard coating compositions of the present invention require the presence of from 0.5 to 8% of at least one surfactant. The choice of surfactant utilized in the emulsions depends primarily upon whether an oil-in-water or a water-in-oil emulsion is desired. The choice of these particular surfactants is well within the skill of a person of ordinary skill in the emulsion coating composition art. Substantially any type of surfactant, i.e., anionic, cationic, nonionic, amphoteric, zwitterionic, etc. can be utilized although it is preferred that anionic, nonionic or mixtures of anionic and nonionic surfactants be utilized in the emulsion compositions of the present invention. Those skilled in the surface coating composition art will recognize that certain surfactants are preferred over other surfactants both from the standpoint of emulsion stability and/or product performance. Although the compositions of the present invention require some surfactant, the particular surfactant utilized is not particularly critical although as noted above there are some preferred surfactants which are recognized by those skilled in the art.

Suitable anionic surfactants include the soap type anionic surfactants which can be prepared in situ utilizing various amines and the like which combine with fatty acids also present in the composition. Within this class of materials it is preferred to use those soaps formed from fugitive cations such as morpholine, ammonium, triethanolamine, etc. Furthermore, it is preferred to use the C18 fatty acids both saturated and unsaturated as the performance properties of these particular anionic surfactants is far superior to the lower C16 and below fatty acid soaps. Other suitable anionic surfactants include the higher alkyl sulfates, the alkaryl sulfonates, the ethoxylated higher alkyl sulfonates and the like. Again, to reduce the water substantivety of the resulting film it is preferred to utilize fugitive cations.

Nonionic surfactants suitable for use in the compositions of the present invention include the alcohol ethoxylates, the mixed ethoxylate and propoxylate compounds of the Pluronic and Plurofac series and the like.

Other surfactants in addition to those noted above can be found in McCutchen's Detergents and Emulsifiers, North American Edition, 1979, the disclosure of which is incorporated herein by reference.

As noted above, the surfactants should be present in an amount of from 0.5 to 8% by weight of the total composition. It is preferred to utilize from 0.5 to 5%, most preferred to utilize from 1 to 3% total surfactant in the compositions of the present invention.

The compositions of the present invention also will include from 0 to 20% by weight preferably from 1 to 20% and most preferably from 2 to 15% of an abrasive. If the composition is to be used as an auto polish it is preferred to incorporate some abrasive into the composition to provide some abrasive cleaning function to the compositions of the present invention. Typical abrasives utilized in these types of compositions include the following: aluminum silicate, diatomaceous earth, calcium silicate, silica, alumina, perlite and mixtures thereof. Obviously the abrasive should be chosen considering the hardness of the surface to be cleaned and coated. Obviously the hardness, mesh size, and oil absorption of the abrasive chosen will be determined by the components of the composition and the substrate to be coated. Preferred abrasives are aluminum silicate, diatomaceous earth and the like.

The compositions of the present invention also include at least one silicone fluid. Generally the silicone fluid is present in an amount of from 3 to 15% by weight. Suitable silicones include the commercially available silicone fluids having a viscosity of from between 5 to 100,000 centistokes, such as dimethyl polysiloxane, methyl phenyl polysiloxanes, amine functional polysiloxanes, and the like. Also mixtures of silicones can be used. It is preferred that the silicones be present in an amount of from 3 to 8% by weight and most preferably 4 to 6% by weight.

The composition of the present invention may include from 0 to about 10% by weight of a wax. Although no-wax compositions can be prepared, it is preferred to include at least one wax in an amount of from about 1 to 10%. Substantially any wax can be utilized including vegetable waxes, i.e. carnuba, candilla, palm wax, sugarcane and the like as well as mineral waxes such as microcrystalline waxes, paraffin waxes, C30+ alpha olefins, montan, Hoechst waxes, Ozokerite, etc; synthetic waxes such as Fisher-Tropsch, polyethylene and the like and animal waxes such as beeswax, etc. The wax provides a measure of the gloss, durability, and minimizes smearing of the surface after buffing. If the wax content is increased over the maximum, buffing becomes difficult. It is preferred to include at least some wax in the composition as both gloss and durability are improved if some wax is present. It is most preferred that from 3 to 7% wax be present in the composition.

The compositions of the present invention also must include from 0.5 to 3% by weight of an acrylic polymer. By the term "acrylic polymer" is meant a polymer having a substantial monomer content of

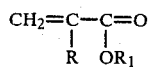

wherein R is H or methyl and $R_1$ is an alkyl or cycloalkyl group having 4 or more carbon atoms or an aromatic or substituted aromatic group. The acrylic polymer should not contain a substantial portion of a polar monomer such as acrylic or methacrylic acid, methyl methacrylate, ethyl acrylate, acrylonitrile, acrylamide, allyl alcohol, itaconic acid, maleic anhydride, and the like. Large percentages of these monomers will make the polymer insoluble in the solvents used in the composition of the present invention.

Examples of suitable acrylic esters for use in these acrylic polymers include the following: cyclohexyl methacrylate, cyclohexyl acrylate, isobornyl methacrylate, isobornyl acrylate, etc. The preferred monomers are cyclohexyl methacrylate and isobornyl methacrylate.

The polymers suited for use in the composition of the present invention must be soluble in the solvent chosen to form the emulsion. It is this solubility which provides the emulsion stability and compatability between the solvent, polymer, wax and silicone in the emulsion of the present invention.

It is preferred that the polymers used in the emulsion of the present invention have a number average molecular weight of greater than 3000. Polymers having a number average molecular weight below 3000 have less durability enhancement than polymers having molecular weight over 3000.

The acrylic polymers should be reasonably hard so that the resulting composition will not be tacky when applied on a hot, i.e. over 45° C., surface such as an automobile which has been sitting in the sun. Therefore, the polymer should contain a substantial portion of a hard monomer. This hard monomer need not be limited to the hard acrylic and methacrylic esters as a minor amount of styrene type monomers may also be used in combination with these esters. Also a reasonable percentage of other modifying monomers can be used.

Some examples of suitable polymers include: the homopolymers of cyclohexyl methacrylate, copolymers of cyclohexyl methacrylate with up to 35% of a soft acrylic ester such as butyl acrylate, 2-ethyl hexyl acrylate, and the like, copolymers of cyclohexyl methacrylate and styrene-type monomers such as styrene, alpha methyl styrene, t-butyl styrene and the like, homopolymers of isobornyl methacrylate, copolymers of isobornyl methacrylate with up to 35% of a soft acrylic ester such as butyl acrylate, 2-ethylhexyl acrylate, and the like, copolymers of isobornyl methacrylate and styrene-type monomers such as styrene, alpha methyl styrene, t-butyl styrene and the like.

The choice of the particular acrylic polymer must be made after considering a number of factors such as degree of solubility in the solvent, hardness of the polymer, the adhesion of the polymer in the resulting film, ultraviolet stability, water resistance, detergent resistance, etc.

The acrylic polymers invention should be present in an amount of from about 0.5 to 3% and preferably from about 0.5 to 2% by weight of the weight of the composition.

The polymers used in the emulsion of the present invention can be prepared by any conventional polymerization technique. The coating compositions also can contain small amounts of other optional ingredients such as preservatives, thickeners, dyes, pigments and perfumes.

The emulsions can be prepared over a wide range of viscosities to produce liquid products, soft paste products and gels.

The compositions of the present invention will now be more fully described by the following examples wherein all parts and percentages are by weight and all temperatures and degrees centigrade.

EXAMPLE A

Under a blanket of nitrogen gas heat 268 grams of mineral spirits #2 NPR to 110° C. Add 3.76 grams of tertiary butyl peroctoate. Then at a constant rate over 2 hours add a solution of 9.44 grams of t-butyl peroctoate and 400 grams of 90% pure cyclohexyl methacrylate while maintaining the temperature at 110° C. At intervals of 1, 2 and 3 hours after the monomer feed has been completed, add a further 1.88 grams of t-butyl peroctoate and hold for a further 2 hours at 110° C. At that point cool to 90° C. and add 4.68 grams of t-butyl peroctoate and hold at that temperature for 16 hours. Cool the mixture to room temperature. The analysis was 56.4% nonvolatile and the composition included 1.9% unreacted cyclohexyl methacrylate and 4% unreacted cyclohexyl alcohols. The polymer had a number average molecular weight of about 5,160, a weight average molecular weight of about 17,200 and a Z average molecular weight of about 39,500 when measured by gel permeation chromatographic techniques using polymethylmethacrylate as a calibration standard.

EXAMPLE 1

Part A

| | |
|---|---|
| Dimethyl silicone fluid 1,000 centistoke | 5.60% |
| Dimethyl silicone fluid 10,000 centistoke | 0.40 |
| Amine functional silicone fluid 50% (SWS F-770) | 3.00 |
| High flash naphtha #3 | 13.30 |
| Solvent 460 NPR | 17.65 |
| Paraffin Wax 132-134° F. Melting Point | 1.20 |
| Microcrystalline Wax 165-170° F. Melting Point | 0.30 |
| Petronauba C | 2.00 |
| Carnauba Wax | 1.50 |
| Polymer of Example A | 1.70 |

Part B

| | |
|---|---|
| Water | 25.00% |
| Polyoxyethylene (4 Lauryl Ether) | 0.25 |
| Polyoxyethylene (23 Lauryl Ether) | 0.60 |

The components of Part A are mixed together and heated to 88° C. with agitation to form a solution. The components of Part B are heated to 91° C. and agitated to a clear solution. Then to Part B the following materials are added with strong agitation:

Part C

| | |
|---|---|
| Aluminum Silicate | 14.00% |
| Morpholine | 0.70 |
| Part A | |
| Formaldehyde, 37% | 0.30 |

After the formaldehyde is added the agitation is reduced to moderate agitation and 28% ammonia, 0.50% is added along with 12% of a 2% ethylene maleic anhydride resin solution which acts as a thickener. The mixture is agitated for uniformity and allowed to cool to room temperature. The above formulation is an oil-in-water emulsion. This formulation when applied to automobile finish surfaces spreads to an even film which dries to a haze in a short period of time. The film exhibits substantially no bloom and was easily buffed to a uniform glossy finish. This formulation also is not tacky even if applied to finishes which have a surface temperature of in excess of 60° C. These auto coatings with this composition are highly detergent resistant.

The above composition was applied to a steel panel previously coated by the Ford Motor Company with an automobile finish composition and set aside overnight. The panel is then subjected to abrasion using a Gardner scrubber fitted with a brush having approximately 1" nylon bristles. The brush is soaked in a 5% solution of commercially available automatic car wash detergent (Shur Wonder Wash from the Gold Eagle Company, Chicago, Ill.). At each 100 cycles the panel is evaluated for water beading and the brush is again soaked in the 5% detergent solution. The above composition having 1000 cycles still showed appreciable water beading while a similar composition not containing the cyclohexyl methacrylate polymer was noticeably deficient in water beading after 300 cycles. Tests with 1000 cycles is roughly equivalent to the amount of abrasion imparted to an auto surface passing through an automatic car wash approximately 20 times.

EXAMPLES 2-5

Using the procedure of Example 1, the following four formulations were prepared:

| | EX 2 | EX 3 | EX 4 | EX 5 |
|---|---|---|---|---|
| EMA-91 (2% Aqueous Solution) | 15.00 | 15.00 | 15.00 | 15.00 |
| Morpholine | 0.30 | 0.30 | 0.30 | 0.30 |
| NH$_4$OH (28%) | 0.55 | 0.55 | 0.55 | 0.55 |
| Formaldehyde (37%) | 0.30 | 0.30 | 0.30 | 0.30 |
| Polyoxyethylene (4 lauryl ether) | 0.25 | 0.25 | 0.25 | 0.25 |
| Polyoxyethylene (23 lauryl ether) | 0.60 | 0.60 | 0.60 | 0.60 |
| Dimethyl silicone fluid (1,000 cstk) | 6.00 | 6.00 | 6.00 | 6.00 |
| High Flash Naphtha | 12.25 | 12.25 | 12.25 | 12.25 |
| Solvent 460 | 15.00 | 15.00 | 16.00 | 16.00 |
| Water | | | | |
| Paraffin 130-132° F. | 1.20 | 1.20 | 1.20 | 1.20 |
| Microcrystalline Wax 160-165° F. MP | 0.30 | 0.30 | 0.30 | 0.30 |
| Petronauba C | 2.00 | 2.00 | 2.00 | 2.00 |
| Hoechst E | 1.50 | 1.50 | 1.50 | 1.50 |
| Kaopolite SF | 16.00 | — | 14.00 | — |
| Calcined Al Silicate | — | 16.00 | — | 14.00 |
| Amine Functional Silicone | 2.00 | 2.00 | 3.00 | 3.00 |
| Polymer from Ex. A | 1.75 | 1.75 | 1.75 | 1.75 |

The above formulations when applied performed satisfactorily and had improved detergent resistance compared to similar formulations without the acrylic polymer. Of these formulas, the formula of Example 5 had better buff than Example 4 which had better buff than Example 3 which had better buff than Example 2. However, each of the formulations was satisfactory from an application standpoint and was able to be buffed to an even gloss with no bloom.

EXAMPLES 6-8

The following three examples were prepared using the procedure of Example 1. In all examples the only variable is the abrasive which are different grades of diatomaceous earth.

|  | EX 6 | EX 7 | EX 8 |
| --- | --- | --- | --- |
| EMA-91 (2% aqueous solution) | 16.50 | 16.50 | 16.50 |
| Morpholine | 0.30 | 0.30 | 0.30 |
| Ammonia (28%) | 0.55 | 0.55 | 0.55 |
| Formaldehyde (37%) | 0.30 | 0.30 | 0.30 |
| Polyoxyethylene (4 lauryl ehter) | 0.25 | 0.25 | 0.25 |
| Polyoxyethylene (23 lauryl ether) | 0.60 | 0.60 | 0.60 |
| Dimethyl Silicone Fluid (1,000 cstk) | 6.00 | 6.00 | 6.00 |
| High Flash Naphtha | 13.75 | 13.75 | 13.75 |
| Solvent 460 | 18.00 | 18.00 | 18.00 |
| Water | 25.00 | 25.00 | 25.00 |
| Paraffin Wax 130–132° F. MP | 1.20 | 1.20 | 1.20 |
| Microcrystaline Wax 160–165° F. MP | 0.30 | 0.30 | 0.30 |
| Petronauba C | 2.00 | 2.00 | 2.00 |
| Carnauba Wax | 1.50 | 1.50 | 1.50 |
| Cyclohexyl methacrylate polymer* | 1.75 | 1.75 | 1.75 |
| Amine functional silicone (50%) (SWS-F770) | 2.00 | 2.00 | 2.00 |
| Satintone #5 Aluminum Silicate | 4.00 | 5.00 | 5.00 |
| K-803 (Witco-Diatomaceous Earth) | 6.00 | — | — |
| Dicalite PS Filler | — | — | 5.00 |
| White Filler | — | 5.00 | — |

*56.4% Non-volatiles, $M_n$—6,020, $M_w$—20,400, $M_z$—43,200
Prepared using procedure of Example A.

Of the compositions, Example 8 had the best buff and uniformity followed by Example 6 and Example 7. However, Example 8 was down slightly in gloss. Each of these compositions had improved detergent resistance when compared to similar formulations not containing the acrylic polymer.

EXAMPLE 9

The following formulation was prepared using the procedure of Example 1 with the exception that the oleic acid is added along with the morpholine formula

| Morpholine | 0.40 |
| --- | --- |
| Ammonia (28%) | 2.00 |
| Oleic Acid | 7.25 |
| Ricinoelic Acid | 2.00 |
| Dimethyl Silicone Fluid (100 cstk) | 1.00 |
| Dimethyl Silicone Fluid (1,000 cstk) | 2.00 |
| Solvent 460 | 20.50 |
| Water | 44.35 |
| Polymer from Example A | 1.50 |
| C30 + Alpha Olefin | 1.00 |
| Aluminum Silicate | 14.00 |
| Dow Corning 531 Amine Functional Silicone Fluid | 3.00 |
| Dow Corning 536 Amine Functional Silicone Fluid | 1.00 |

The above formulation had good application and buff characteristics showing substantially no bloom on application and had good detergent resistance.

EXAMPLE 10

Utilizing the procedure of Example 1, the following formulation was prepared:

| Ammonia (28%) | 0.80% |
| --- | --- |
| Octyl Phenol + 5 EO | 0.30 |
| Octyl Phenol + 16 EO | 0.80 |
| Formaldehyde (37%) | 0.30 |
| Dimethyl Silicone Fluid (1,000 cstk) | 6.00 |
| High Flash Naphtha #3 | 15.00 |

-continued

| Solvent 460 | 18.85 |
| --- | --- |
| Water | 26.00 |
| Paraffin Wax 135–137° F. MP | 1.20 |
| Microcrystalline Wax | 0.30 |
| Filtered Carnauba Wax | 1.50 |
| Hoechst Wax S | 2.00 |
| EMA-91 2% Aqueous Solution | 15.00 |
| Aluminum Silicate | 5.00 |
| Diatomaceous Earth | 5.00 |
| Polymer from Example A | 1.95 |

The above formulation had properties essentially equivalent to that of Example 1.

EXAMPLE 11

A water-in-oil paste auto polish was prepared utilizing the following compositions and procedure:

Part A

| Sorbitan Monooleate | 1.00% |
| --- | --- |
| Dimethyl Silicone Fluid (1,000 cstk) | 6.00 |
| Dow Corning 531 Amine Functional Silicone Fluid | 3.00 |
| Dow Corning 536 Amine Functional Silicone Fluid | 1.00 |
| High Flash Naphtha #3 | 30.00 |
| Hoechst Wax E | 2.00 |
| Filtered Carnauba Wax | 2.00 |
| Paraffin Wax 132–134° F. MP | 0.80 |
| Polymer from Example A | 1.50 |

Part B

| Water | 38.20% |
| --- | --- |
| Morpholine | 0.50 |
| Calcined Aluminum Silicate (Satintone 5) | 7.50 |

Heat components of Part A to 85° C. with mild agitation. When a clear solution is obtained add 5% Kaopolite SF-O with strong agitation. The components of Part B are heated to 88° C. and mixed. This mixture is then added to Part A. The combined composition is then cooled to 63° C. with agitation and passed through an orifice plate to provide sheer pressure on the composition. The composition is then cooled to ambient temperature. Although the detergent resistance of this composition is somewhat reduced over that of Example 1 this composition performs substantially better than a similar composition not containing the cyclohexyl methacrylate relating to detergent resistance and water beading.

EXAMPLE 12

The procedure of Example 1 is repeated with the exception that the following formulation is prepared and the amine functional silicones and an equal portion of the naphtha are post-added to emulsion with agitation:

| EMA-91 2% Aqueous Solution | 4.00% |
| --- | --- |
| Morpholine | 0.80 |
| Ammonia 28% | 0.30 |
| Sorbitan Monooleate | 0.30 |
| Formaldehyde 37% | 0.20 |
| Oleic Acid | 0.80 |
| Amorphous Silica | 5.50 |
| Dimethyl Silicone Fluid | |

| -continued | |
|---|---|
| (1,000 cstk) | 3.00 |
| Dimethyl Silicone Fluid | |
| (10,000 cstk) | 3.00 |
| High Flash Naphtha #3 | 33.50 |
| Water | 27.10 |
| Dow Corning 531 Amine Functional Silicone Fluid | 3.00 |
| Dow Corning 536 Amine Functional Silicone Fluid | 0.50 |
| Polymer from Example A | 1.50 |
| Aluminum Silicate (Satintone #5) | 11.00 |
| Diatomaceous Earth (Witco K 803) | 5.50 |

This composition had high gloss, uniformity, good detergent resistance and good application properties.

EXAMPLE 13

The composition of Example 1 was repeated with the exception that the cyclohexyl methacrylate polymer was replaced by a homopolymer of isobornyl methacrylate. This composition when subjected to the scrubbing test using the Gardner Scrubber performed essentially equivalent to the formulation of Example 1. This formulation had good gloss and application properties and buffed out well and did not create any problems with bloom.

EXAMPLE 14

The composition of Example 1 was prepared with the exception that the cyclohexyl methacrylate polymer was replaced with a copolymer of 70% isobornyl methacrylate and 30% butyl acrylate. This formulation had good gloss and application properties and when tested using the Gardner Scrubber gave good water beading after 1,000 cycles. This formulation although having good detergent resistance is somewhat softer than the formulation of Example 1 and is slightly tacky although still acceptable if applied to painted metal surfaces having a surface temperature of about 65° C.

The following is an identification of the tradename materials used in the preceding examples.

EMA-91: A cross-linked, water-soluble copolymer, anhydride form of ethylene maleic anhydride; Monsanto Industrial Chemicals Company.

Solvent 460 and solvent 460 NPR: Hydrocarbon solvents having an initial boiling point of 366° F. and an M point of 475° F.; Shell Chemical Company.

High Flash Naphtha, Varsol 1: A hydrocarbon solvent having an initial boiling point of 313° F. and a dry point of 395° F.; Exxon Company U.S.A.

High Flash Naphtha No. 3, Varsol 3: A hydrocarbon solvent having an initial boiling point of 310° F. and a dry point of 348° F.; Exxon Company U.S.A.

Petronauba C: An oxidized/chemically reacted hydrocarbon wax, melting point 195° F.; Bareco Division, Petrolite Corporation.

Hoechst E: An ester wax based on Montan Wax, drop point 168°–178° F.; American Hochst.

Kaopolite SF: An anhydrous aluminum silicate; Kaopolite, Inc.

Dicalite PS: A marine diatomite structure, amorphous and isotropic, essentially siliconedioxide; Grefco, Inc.

C-30+ Alpha Olefin; Gulftane 30+: A mixed alpha olefin hydrocarbon, having mostly $C_{30}$ and higher chain length hydrocarbons; Gulf Oil Chemicals.

Hoechst Wax S: An acid wax based on Montan Wax, drop point 172°–182° F.; American Hoechst.

We claim:

1. An emulsion hard surface coating composition comprising:
   (a) At least one solvent of (i) a poor hydrogen bonding solvent the solubility parameter of the solvent being from about 6.0 to 8.2 or (ii) a moderate hydrogen bonding solvent, the solubility parameter of the solvent being from about 6.0 to 7.5;
   (b) Water;
   (c) From about 0.5 to % by weight of at least one surfactant;
   (d) From 0 to about 20% by weight of an abrasive;
   (e) From about 3 to 15% by weight of at least one silicone;
   (f) From 0 to about 10% by weight of a wax; and
   (g) From about 0.5 to 3% by weight of an acrylic polymer which has an $M_n$ of greater than about 3000 and is soluble in said solvent, with the proviso that: (i) if the emulsion is an oil-in-water emulsion, then the solvent is present in an amount of from about 5–65% by weight and the water is present in an amount of from about 15 to 90% by weight; or (ii) if the emulsion is a water-in-oil emulsion, then the solvent is present in an amount of from about 15–90% by weight and the water is present in an amount of from about 5 to 65% by weight.

2. An oil-in-water emulsion hard surface coating composition comprising:
   (a) From about 5–65% by weight of at least one solvent of a poor hydrogen bonding solvent the solubility parameter of the solvent being from about 6.0 to 8.2 or (ii) a moderate hydrogen bonding solvent, the solubility parameter of the solvent being from about 6.0 to 7.5;
   (b) From about 15 to 90% by weight of water;
   (c) From about 0.5 to 8% by weight of at least one surfactant;
   (d) From 0 to about 20% by weight of an abrasive;
   (e) From about 3 to 15% by weight of at least one silicone;
   (f) From 0 to about 10% by weight of at least one wax; and
   (g) From about 0.5 to 3% by weight of an acrylic polymer which has an $M_n$ of greater than about 3000 and is soluble in said solvent.

3. The composition of claim 2 wherein the composition has from about 1 to 10% by weight wax.

4. The composition of claim 2 wherein the solvent has a solubility parameter of from about 6.5 to 8.2 where the solvent is a poor hydrogen bonding solvent or the solvent has a solubility parameter of from about 6.5 to 7.5 where the solvent is a moderate hydrogen bonding solvent.

5. The composition of claim 2 wherein the composition has from about 1 to 20% by weight abrasive.

6. The composition of claim 2 wherein the composition comprises:
   (a) From about 20 to 60% by weight of said solvent;
   (b) From about 25 to 45% by weight water;
   (c) From about 0.5 to 5% by weight of at least one surfactant;
   (d) From about 1 to 20% by weight of said abrasive;
   (e) From about 3 to 8% by weight of said silicone;
   (f) From about 1 to 10% by weight of said wax;
   (g) From about 0.5 to 2% by weight of said polymer.

7. A water-in-oil hard surface coating composition comprising:
  (a) From about 15 to 90% by weight of at least one solvent of (i) poor hydrogen bonding solvent the solubility parameter of the solvent being from about 6.0 to 8.2 or (ii) a moderate hydrogen bonding solvent, the solubility parameter of the solvent being from about 6.0 to 7.5;
  (b) From about 5 to 65% by weight water;
  (c) From about 0.5 to 8 % by weight of at least one surfactant;
  (d) From 0 to about 20% by weight of an abrasive;
  (e) From about 3 to 15% by weight of a silicone;
  (f) From 0 to about 10% by weight of a wax; and
  (g) From about 0.5 to 3% by weight of an acrylic polymer which has an $M_n$ of greater than about 3000 and is soluble in said solvent.

8. The composition of claim 7 wherein the composition has from about 1 to 10% by weight wax.

9. The composition of claim 7 wherein the solvent has a solubility parameter of from about 6.5 to 8.2 where the solvent is a poor hydrogen bonding solvent or the solvent has a solubility parameter of from about 6.5 to 7.5 where the solvent is a moderate hydrogen bonding solvent.

10. The composition of claim 7 wherein the composition has from about 1 to 20% by weight abrasive.

11. The composition of claim 2 wherein the composition comprises:
  (a) From about 20 to 45% by weight of said solvent;
  (b) From about 20 to 60% by weight water;
  (c) From about 0.5 to 5% by weight of at least one surfactant;
  (d) From about 1 to 20% by weight of said abrasive;
  (e) From about 3 to 8% by weight of said silicone;
  (f) From about 1 to 10% by weight of said wax;
  (g) From about 0.5 to 2% by weight of said polymer.

* * * * *

UNITED STATES PATENT OFFICE
CERTIFICATE OF CORRECTION

Patent No. 4,347,333     Dated August 31, 1982

Inventor(s) Robert H. Lohr & Lee W. Morgan

It is certified that error appears in the above-identified patent and that said Letters Patent are hereby corrected as shown below:

It is certified that error appears in the above-identified patent and that said Letters Patent are hereby corrected as shown below:

In Column 8, Line 46, after the word "Water", the number --25.00-- should be inserted in each column under EX 2, EX 3, EX 4 and EX 5.

In Column 8, Line 47, "Paraffin 130-132° F." should read --Paraffin 130-132° F. MP--.

In Column 9, Line 9, the word "ehter" should read --ether--.

In Column 12, Line 12, "%" should read --8%--.

Signed and Sealed this

Seventh Day of December 1982

[SEAL]

Attest:

GERALD J. MOSSINGHOFF

Attesting Officer     Commissioner of Patents and Trademarks